(12) United States Patent
Rettig et al.

(10) Patent No.: US 6,205,703 B1
(45) Date of Patent: Mar. 27, 2001

(54) CASING MATERIAL FOR STACKS AND SITTING-OUT AREAS IN MUSHROOM CULTURE

(75) Inventors: Bernd Rettig, Neuss; Jan Lelley, Köln; Rudolf Jaeger, Krefeld, all of (DE)

(73) Assignee: Stora Reisholz GmbH, Düsseldorf (DE)

( * ) Notice: Subject to any disclaimer, the term of this patent is extended or adjusted under 35 U.S.C. 154(b) by 0 days.

(21) Appl. No.: 09/269,129

(22) PCT Filed: Sep. 18, 1997

(86) PCT No.: PCT/EP97/05112

§ 371 Date: Mar. 19, 1999

§ 102(e) Date: Mar. 19, 1999

(87) PCT Pub. No.: WO98/11771

PCT Pub. Date: Mar. 26, 1998

(30) Foreign Application Priority Data

Sep. 20, 1996 (DE) .............................. 196 38 481

(51) Int. Cl.⁷ ........................................ A01G 1/04
(52) U.S. Cl. ........................................ 47/1.1
(58) Field of Search ..................................... 47/1.1

(56) References Cited

U.S. PATENT DOCUMENTS

| | | | | |
|---|---|---|---|---|
| 4,079,543 | * | 3/1978 | Stoller | 47/1.1 |
| 4,170,842 | * | 10/1979 | Stoller | 47/1.1 |
| 4,443,969 | * | 4/1984 | Hanacek et al. | 47/1.1 |
| 5,443,612 | * | 8/1995 | Havens | 71/5 |
| 5,503,647 | * | 4/1996 | Dahlberg et al. | 47/1.1 |
| 5,888,803 | * | 3/1999 | Starkey | 47/1.1 X |
| 6,073,388 | * | 6/2000 | Kananen et al. | 47/1.1 |

FOREIGN PATENT DOCUMENTS

WO93/13647 * 7/1993 (WO).
WO96/04777 * 2/1996 (WO).

* cited by examiner

Primary Examiner—Michael J. Carone
Assistant Examiner—Jeffrey L. Gellner
(74) Attorney, Agent, or Firm—Cohen, Pontani, Lieberman & Pavane

(57) ABSTRACT

A covering material for stacks and beds for mushroom cultivation made up of 50 to 80 percent by volume filter cake from paper manufacturing and 20 to 50 percent by volume aggregate such as peat, vegetable fibers, milled limestone and/or marl with improved water storing capability and reduced nutritive content.

3 Claims, No Drawings

CASING MATERIAL FOR STACKS AND SITTING-OUT AREAS IN MUSHROOM CULTURE

BACKGROUND OF THE INVENTION

1. Field of the Invention

The invention is directed to a covering material capable of sorption for stacks and beds for mushroom cultivation.

2. Discussion of the Prior Art

Covering materials for stacks and beds for mushroom cultivation differ in substantial respects from the actual substrates for mushrooms. While the substrate consists for the most part of pre-treated horse manure, the covering material, as the name suggests, should cover the substrate, provide sufficient moisture for the mushrooms and create an environment in which an intensive formation of the fruiting body takes place. After the mushroom culture is harvested, the substrate is depleted with respect to nutrients. At the present time, black peat and, to a lesser extent, also white peat are mainly used for providing covering materials. For reasons of conservation of nature and to preserve peat bed locations, it is important to substantially eliminate the use of peat in mushroom cultivation.

Covering materials made from fibrous materials are generally known for use in agriculture. For example, U.S. Pat. No. 5,251,398 relates to a method for protecting plants from frost using hydrated cellulosic fibers.

EP-0 556 150 teaches a material in sheet form which is produced on a paper machine and can contain, among others, peat as fibrous material for use in agriculture for preventing erosion due to wind or water.

DE-44 16 030 A1 discloses a generic covering material which can be obtained through comminution of waste paper with the addition of water. A disadvantage in this process is that refuse which may possibly be contained in the waste paper, especially glass fragments, can lead to problems in the processing plant and this refuse causes additional disposal costs. Another disadvantage consists in that the waste paper market is subject to sharp fluctuations, so that there is no consistent supply of inexpensive raw material for the described process.

SUMMARY AND DESCRIPTION OF THE INVENTION

Therefore, it is the object of the present invention to provide a covering material that is formed of starting materials of which there is a surplus in practice and that can be made available without elaborate machinery.

Pursuant to this object, and others which will become apparent hereafter, one aspect of the present invention resides in a covering material for stacks and beds for mushroom cultivation that comprises peat, cellulosic fibers and wood pulp fibers mixed with mineral substances characterized by the combination of the following features:

A first part in the amount of 50 to 80 percent by volume comprises filter cakes comprising residual materials from paper manufacture, namely 40 to 60 percent unusable fibers and 60 to 40 percent unusable white pigments.

These residual materials occur as sludge in the chemical-mechanical sewage clarification of the paper factory. This sludge is dewatered by means of filter presses or sieve belt presses to a dry content of 35 to 60 percent by weight and is then available as a starter component.

A second proportion of 20 to 50 percent by volume is made up of aggregates selected from peat, vegetable fibers and/or ground limestone and/or marl and/or a molasses from the sugar industry. The aggregates impart the desired properties to the covering material with respect to fine crumbliness, structure, air permeability, resistance to surface sealing when irrigated, and buffer capacity with respect to pH. Coconut fibers, waste from hemp or flax processing and cotton waste, to name only a few examples, are used in addition to peat as vegetable fibers. It must be ensured only that the vegetable fibers used are not too long so that spinning can be prevented.

The ratio of organic to inorganic portions of the covering material is 90:10% to 60:40 % and is selected in a simple manner by varying the proportions of filter cakes and aggregates. It goes without saying that the composition of the individual components with respect to organic and inorganic constituents is previously known.

The water storing capacity of the covering material according to the invention is promoted by the individual components mentioned above in such a way that it reaches a value of up to three times the absolutely dry net weight.

In order not to negatively influence mushroom growth, the pH of the covering material is 6.5 to 8.0 measured in aqueous slurry. Values above or below this are adjusted by increasing the proportion of buffering minerals. Possible buffering minerals of this kind are kaolin or calcium carbonate.

The covering material according to the invention is characterized by the further feature that it has a reduced nutrient content with respect to potassium, phosphorus and nitrogen. In this way, one of the principle requirements, namely, the suppression of growth of competing organisms on the covering material, is achieved. Since the filter cake from paper manufacture only contains a very small proportion of nutrients, this feature is met in a very simple manner.

The proportion of nutrient content with respect to potassium is less than 0.15%, less than 0.5% nitrogen and less than 0.08% phosphorus—all values with respect to absolutely dry covering material. This demand is met in that the ratio of filter cake to aggregate is selected in favor of the filter cake.

In a preferred embodiment of the invention, the mineral substances contain layered silicates such as kaolin or bentonites. Layered silicates are capable of expansion under the influence of water and thus positively influence the water absorption of the covering material. Kaolin has the further advantage that it has an alkaline buffer capacity and can therefore positively influence the pH of the covering material.

In another preferred embodiment of the invention, the mineral substances are white pigments used in the paper industry such as, e.g., kaolin, calcium carbonate, talc, titanium dioxide and/or satin/glazing white. The white pigments are found in the filter cake especially when the paper factory produces coated papers. Therefore, it is no longer necessary, for example, to add kaolin or ground limestone separately as aggregate with the aim of pH buffering. Satin/glazing white also has a high acid neutralizing capacity due to its alkalinity.

If analysis of the filter cake shows a residual nutrient content above the limiting values mentioned above, this residual nutrient content is reduced in a further advantageous arrangement of the invention in that the filter cake is subjected to additional retting.

The invention will next be described more fully with reference to an example.

EXAMPLE

For the purpose of preparing the covering material according to the invention, a filter cake having the following characteristics is used:

| Dry content | Incineration/ashing residue | | |
|---|---|---|---|
| 38 to 42% | 35.8% | | |
| pH 7.4 | comprising: | 25% | kaolin |
| | | 5% | talc |
| | | 5.8% | $CaCO_3$ |

Organic component:
peat, cellulosic+wood pulp fibers. 30 kg absolutely dry white peat with a dry content of 70% are added to 70 kg (absolutely dry) filter cake and intimately mixed. The resulting covering material has a fine crumbling structure. The moisture content is 54%. The analysis of vegetable nutrient contents shows 0.09% potassium, 0.32% nitrogen and 0.04% phosphorus calculated as $P_2O_5$ all values with respect to absolutely dry substance.

What is claimed is:

1. A casing material capable of sorption for stacks and beds for mushroom cultivation, for arrangement on a mushroom substrate, comprising peat fibers, cellulosic fibers and wood pulp fibers mixed with mineral substances with a predominant fine grain component of less than 10 mm, the mineral substances additionally containing expandable layered silicates, the casing material including:
   a) 50 to 80 percent by weight filter cake from paper manufacture; and
   b) 20 to 50 percent by weight aggregates selected from at least one of peat, natural vegetable fibers, ground limestone and marl, the casing material having a ratio of organic to inorganic portions of 90:10% to 60:40%, and a water storing capacity of up to 3 times absolutely dry net weight, the casing material being adjusted to a pH of 6.5 to 8.0; and further being adjusted with respect to nutrient content to less than 0.15% potassium, less than 0.5% nitrogen and less than 0.08% phosphorus.

2. A casing material capable of sorption for stacks and beds for mushroom cultivation, for arrangement on a mushroom substrate, comprising peat fibers, cellulosic fibers and wood pulp fibers mixed with mineral substances with a predominant fine grain component of less than 10 mm, the mineral substances containing white pigments from the paper industry, the casing material including:
   a) 50 to 80 percent by weight filter cake from paper manufacture; and
   b) 20 to 50 percent by weight aggregates selected from at least one of peat, natural vegetable fibers, ground limestone and marl, the casing material having a ratio of organic to inorganic portions of 90:10% to 60:40%, and a water storing capacity of up to 3 times absolutely dry net weight, the casing material being adjusted to a pH of 6.5 to 8.0, and further being adjusted with respect to nutrient content to less than 0.15% potassium, less than 0.5% nitrogen and less than 0.08% phosphorus.

3. A casing material capable of sorption for stacks and beds for mushroom cultivation, for arrangement on a mushroom substrate, comprising peat fibers, cellulosic fibers and wood pulp fibers mixed with mineral substances with a predominant fine grain component of less than 10 mm, the casing material including:
   a) 50 to 80 percent by weight filter cake from paper manufacture, the filter cake being additionally retted; and
   b) 20 to 50 percent by weight aggregates selected from at least one of peat, natural vegetable fibers, ground limestone and marl, the casing material having a ratio of organic to inorganic portions of 90:10% to 60:40%, and a water storing capacity of up to 3 times absolutely dry net weight, the casing material being adjusted to a pH of 6.5 to 8.0, and further being adjusted with respect to nutrient content to less than 0.15% potassium, less than 0.5% nitrogen and less than 0.08% phosphorus.

* * * * *